May 20, 1947.   K. L. HANSEN   2,420,950
COMMUTATED TRANSFORMER
Original Filed Aug. 21, 1944
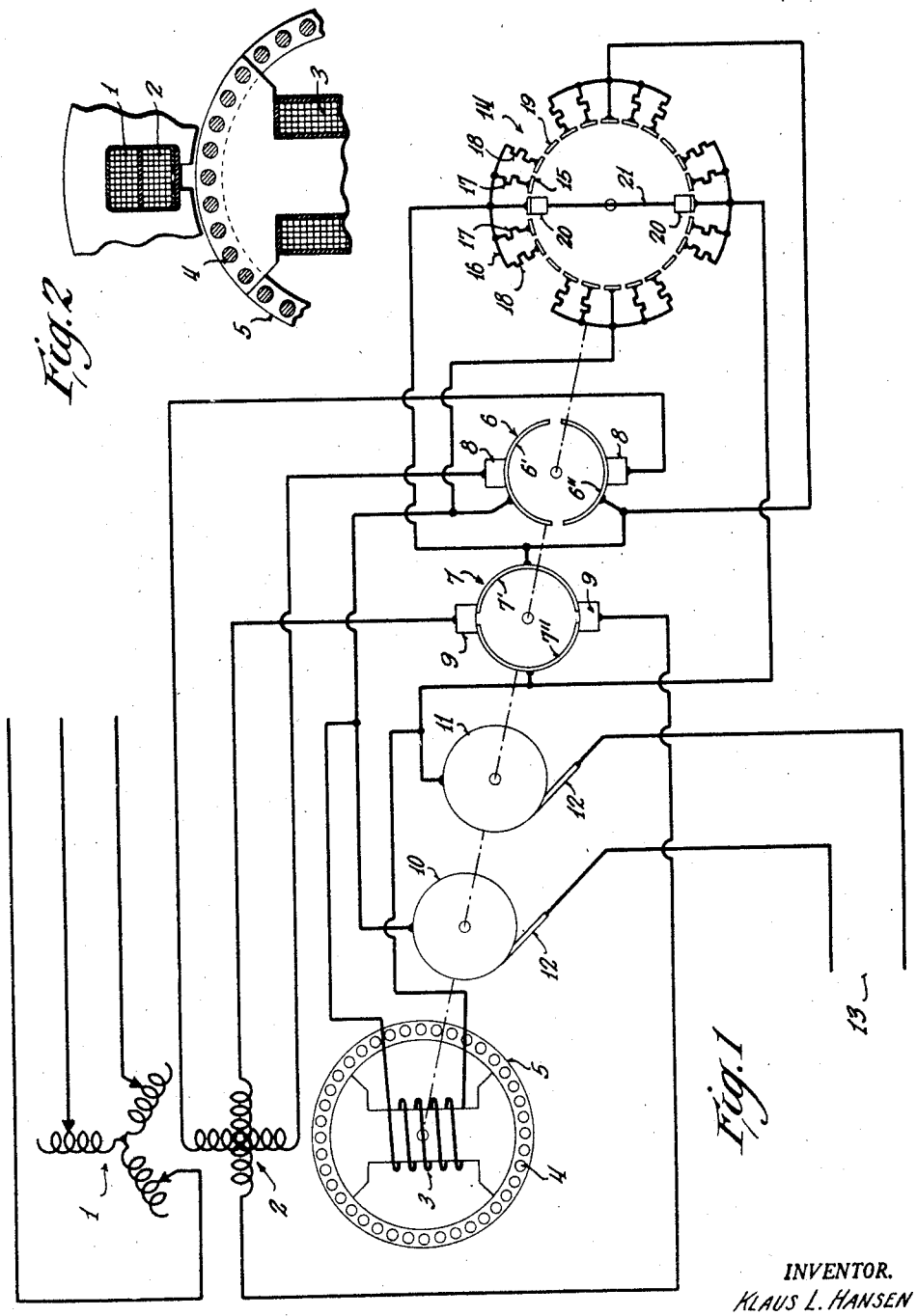
INVENTOR.
KLAUS L. HANSEN
BY
ATTORNEY.

Patented May 20, 1947

2,420,950

UNITED STATES PATENT OFFICE 2,420,950

COMMUTATED TRANSFORMER

Klaus L. Hansen, Milwaukee, Wis.

Original application August 21, 1944, Serial No. 550,429. Divided and this application July 13, 1945, Serial No. 604,773

5 Claims. (Cl. 171—123)

This invention relates to a dynamo-electric machine.

This application is a division of my copending application Serial No. 550,429 filed August 21, 1944, for Rectifier and transformer unit, now Patent No. 2,415,007 dated January 28, 1947.

Objects of this invention are to provide a combined transformer and dynamo-electric machine which is so made that the device has two main elements constituting a rotor and a stator respectively, one of the elements being a transformer element and having polyphase primary and secondary windings, and the other main element having a direct current winding and a short-cuited winding, the element which constitutes the rotor driving the commutating means.

In commutation, particularly polyphase commutation, harmonics are usually produced due to the fact that commutation often occurs at points different from the zero points of the alternating current. These harmonics, if the device were used as an inverter to convert direct current into alternating current and if no provision were made to take care of them, would be passed from the primary through the secondary out on the line and would give trouble, particularly if the line were a high impedance line, as they would cause a loss of energy and would be radiated from the line thus producing interference with communication systems.

Further objects are to provide, in a device of the above defined type, a short-circuited tertiary winding closely interlinked with the primary winding of the transformer and rotated synchronously with the fundamental frequency for which the device is designed.

It has been found that the short-circuited tertiary winding, which is closely interlinked with the primary winding through which the harmonics pass, offers a low impedance path for the harmonics and produces a magnetic flux in opposition to that produced by the harmonics and prevents generation of high voltage due to the harmonics and prevents passage of the harmonics through the transformer unit onto the line and prevents any material waste of energy due to the harmonics. In addition to this it has been found that commutation is also greatly improved.

Further objects of this invention are, therefore, to provide a combined dynamo-electric machine and transformer unit which is so made that harmonics generated due to the action of the commutating means find a low impedance path through the primary windings due to the co-action of the short-circuited tertiary winding with the primary windings of the transformer and are, therefore, prevented from being sent out on the line, and to so arrange the tertiary circuit that it is rotated in synchronism with the fundamental frequency and does not waste any energy due to the fundamental frequency.

Further objects are to provide a combined polyphase dynamo-electric machine and transformer which is so made that commutation takes place for each phase and the output from all of the phases is added in the direct current circuit, in which, when the current flow is reversed with reference to any given primary, a by-pass circuit is formed around such primary to prevent an instantaneous dip or dropping or variation in the direct current due to the reactance of such primary, the arrangement being such that no primary acts as a choke.

In greater detail, further objects are to provide a combined polyphase dynamo-electric machine and transformer which is so made that during the period of commutation for any given phase a variable resistance is inserted in the by-pass circuit around the primary just prior to the instant of rectification, in which this resistance is decreased to an approximate zero value at the instant of commutation and is again inserted in the by-pass circuit just after commutation, and in which the by-pass circuit is either finally opened or else its resistance very greatly increased, the complete opening of the by-pass circuit at this instant being the preferred construction.

Further objects are to provide a device of the above outlined character which may be used, if desired, as an inverter to change direct current to alternating current, or which may be used as a direct current motor driving a mechanical load in which case the secondary would either be left open or wholly omitted.

Further general objects of this invention are to improve commutation.

Further objects are to provide a dynamo-electric machine which is efficient, which is self-starting, and which, though having the desirable characteristics set forth above, is of simple construction.

An embodiment of the invention is shown in the accompanying drawings, in which:

Figure 1 is a schematic view showing the dynamo-electric machine.

Figure 2 is a fragmentary view, partly broken away, showing a portion of the stator and rotor with one of the end rings sectioned off.

The device will be described in detail as an inverter for converting direct current into alternating current, though it is to be understood that the device may be used as a motor driving a mechanical load.

The device comprises a synchronous motor structure in which the two main elements constituting the stator and the rotor are arranged to respectively provide a transformer unit having primary and secondary windings and a second unit having a direct current winding and a short-circuited winding. The invention has been shown with the transformer unit forming the stator unit and the direct current and short-circuited windings carried by the rotor unit, though this arrangement, of course, could be reversed.

Referring to the drawings, it will be seen that the stator is provided with a polyphase secondary winding indicated by the reference character 1, which may be a three phase winding provided with taps. A polyphase primary winding 2 is provided. For simplicity it may be a two phase winding as shown.

The rotor is provided with a direct current winding 3 which is adapted to produce the poles of the rotor. The rotor carries a short-circuited winding which may be in the form of a squirrel cage, the bars being indicated by the reference character 4 and the end rings by the reference character 5. This short-circuited winding constitutes a tertiary winding, as will be seen as the description proceeds, insures a low impedance path for harmonics, prevents their passage out onto the line, prevents any material energy loss due to such harmonics and does not absorb energy at the fundamental frequency for which the device is designed and operated. In the schematic showing in the drawings the rotor has been shown as a two-pole rotor, though, of course, the stator and rotor could be formed so as to provide four poles or any number of poles desired, corresponding changes being made in the number of commutation segments and brushes in the commutating portion of the apparatus. The rotor shaft also carries two commutators indicated generally by the reference characters 6 and 7 each having a pair of segments, indicated at 6' and 6'' and 7' and 7'', respectively. These segments are arranged at right angles to each other. A pair of brushes 8 bear upon the commutator 6 and are connected to opposite sides of one of the two phase primary windings 2. Similarly a pair of brushes 9 bear on the commutator 7 and are connected to opposite ends of the other of the two phase primary windings 2. The segments 7' and 6'' are directly electrically connected. The rotor shaft also carries a pair of slip rings 10 and 11 which are connected respectively to the segments 6' and 7''. Brushes 12 bear on the slip rings and are connected to the source of direct current 13 when the device is used as an inverter to convert direct current into alternating current or when the device is used as a direct current motor for driving a mechanical load.

It is preferable to have the short-circuited winding consisting of the bars 4 and the end rings 5 closely coupled with the primary 2. This is readily accomplished by winding the secondary windings 1 in the outer portions of slots in the stator and winding the primary windings 2 in the inner portions of the slots of the stator. Obviously the primary and secondary windings may be distributed windings or may be formed in any other way desired and may be of the same or of a different number of phases.

By shifting the taps on the secondary 1 any desired alternating current voltage may be obtained when the device is used to convert direct current into alternating current.

It is to be noted that there is a very close interlinking of the primary winding 2 and the short-circuited tertiary winding of the rotor. Consequently harmonics produced by the dynamo-electric machine will be prevented from being transmitted back out onto the line as the short-circuited winding or tertiary winding causes a low impedance path to be offered to these harmonics and at the same time since the short-circuited winding rotates synchronously with reference to the fundamental frequency for which the device is designed, it is apparent that the short-circuited winding will absorb no energy due to that transmitted at the fundamental frequency.

Both the short-circuited tertiary winding and the commutating bridging means hereinafter described in detail coact to improve commutation. It is, of course, within the province of this invention, even in the preferred form, to omit the short-circuited tertiary winding. In this case the entire reliance for excellent commutation would be placed on the short-circuited commutating means.

The preferred form of construction has been illustrated in that the stator is preferably the transformer unit and the rotor preferably carries the short-circuited winding and the direct current winding, though, as stated, these two main units could be reversed.

The commutators 6 and 7 may not interrupt the circuit at exactly the zero point and consequently there is a very pronounced tendency to produce harmonics differing, of course, from the fundamental frequency, but inasmuch as this invention provides means whereby a low impedance path is furnished such harmonics, obviously such harmonics do not waste any material portion of the energy supplied the machine and also are not passed out onto the alternating current line when the device is used as an inverter. It is believed that the above points will be better understood when it is considered that at the instant the commutator 7 is commutating, it is also reversing the current flow through its corresponding primary coil, and, similarly, when the commutator 6 is commutating, it is also reversing the current flow through its corresponding primary coil. It is clear that by providing the short-circuited tertiary winding, this reversal of current is greatly facilitated and commutation is very much improved.

This invention provides means whereby the reversal of current through a particular primary winding of the transformer does not have to suddenly occur. Instead, this invention provides a by-pass short-circuiting path around that particular primary at the instant of commutation for such primary and into this path a variable resistance is interposed just prior to commutation, is reduced to an approximate zero value at the instant of commutation, and is increased just after commutation until that particular primary is in condition, due to its normal transformer action, to take its share of the load. This arrangement thus prevents any primary winding from acting as a choke, the arrangement being such, as will be seen as the description proceeds, that the inserted resistance is confined to the by-pass path and does not increase the resistance in the circuit through the primaries 2, as it is in parallel with that particular primary during commutation.

The immediately above described desirable features are accomplished by adding the commutator indicated generally at 14 to the shaft driven from the rotor. This commutator comprises a plurality of segments 15 which are arranged in four groups with all of the segments of a group connected to a common conductor 16. The centrally located segment of a group is directly connected to the conductor 16. The next adjacent segments on each side thereof are connected to the conductor 16 by small value, high current capacity resistors 17 and the next adjacent segments on each side are connected to the conductor 16 by resistors 18 of higher resistance than the resistors 17 and of high current capacity.

Any number of gradually increasing resistors can be employed. Preferably an idle segment 19 is interposed between each group of segments, though, of course, it is within the province of this invention to connect one group of segments to a succeeding group of segments by a relatively high resistor if so desired. The conductors 16 are connected in a regular order to the segments 6', 6" of the commutator 6 and 7', 7" of the commutator 7. Short-circuiting brushes 20 are directly connected by means of the conductor 21 and bear on diametrically opposed groups of the segments, it being noted that the diametrically opposed groups of the segments for a two-pole rotor as indicated are connected to the segments of the same commutator, for instance the commutator 6, and those at right angles thereto are connected to the segments of the other commutator, for instance the commutator 7.

At the instant that the parts are in the position shown in Figure 1, it is apparent that one phase of the primary windings 2 is supplied with current while the other primary is passing through its zero point and commutation is taking place just at the instant that the reversal of current flow in such other primary winding is about to take place. In order to prevent any choking action of the primary winding then being commutated, a direct short-circuit path or by-pass path is formed around such primary winding and the current flows through this short-circuiting by-pass path, thus preventing the reactance of the primary winding then being commutated from adversely affecting the current flow.

As the commutator 14 rotates, a relatively small value, high capacity resistor is inserted into this by-pass circuit and the resistance of the by-pass circuit is gradually and automatically built up until finally it arrives at an infinite value as such by-pass circuit is opened in the form of the invention shown, thus allowing the last mentioned primary winding to assume its share of the current. The current in the primary circuit, therefore, never drops to zero. It is also to be noted that just prior to commutation for any primary resistances of succeedingly decreasing values are inserted in the by-pass circuit to thus provide a by-pass circuit for the decreasing current flow taking place in that particular primary due to the normal transformer action.

In addition to this, the tertiary circuit, namely, the short-circuited bars on the rotor, prevents the passage of any harmonics out onto the alternating current line.

It is to be understood that the device can be operated to convert direct current into alternating current by supplying direct current to the brushes 12 from the source 13 as has been described in detail. Also the device can be run as a direct current motor in which case the secondary would either be left open or wholly omitted.

When the apparatus is run in the capacity of an inverter, it is to be noted that the amount of energy required by the synchronous motor unit is relatively small in proportion to the amount of energy which is transmitted to the alternating current circuit and consequently the efficiency of the apparatus is high.

It will be seen also that in view of the fact that a rotating field is produced, the device constitutes a self-starting dynamo-electric machine.

It will be seen further that this invention provides a dynamo-electric machine which does not waste any material amount of energy due to harmonics and prevents the harmonics from being passed onto the alternating current line and prevents the primary windings from acting as chokes during commutation when the current flow therethrough is reversed and in which an average value of direct current is drawn from the direct current source without allowing the direct current to drop to zero value at any portion of the commutation cycle.

It is within the province of this invention to provide a construction in which a single phase secondary is used and a polyphase primary in the transformer element of the unit. Under these conditions the motor would run as a direct current motor and polyphase current would be generated in the primary of the transformer element and single phase current would be generated in the secondary.

Although this invention has been described in considerable detail, it is to be understood that such description is intended as illustrative rather than limiting, as the invention may be variously embodied and is to be interpreted as claimed.

I claim:

1. A dynamo-electric machine comprising a plurality of windings bearing a polyphase relation to each other, a rotor having a direct current winding, a plurality of slip rings driven from said rotor, brushes bearing on said slip rings, a plurality of commutators driven from said rotor and connected in series between said slip rings and connected to the direct current winding of said rotor, brushes bearing on said commutators and connected to said windings, and means for establishing a conductive by-pass circuit around each of said windings during commutation with respect to such winding.

2. A dynamo-electric machine comprising a plurality of windings bearing a polyphase relation to each other, a rotor having a short-circuited winding and having a direct current winding, a plurality of slip rings driven from said rotor, brushes bearing on said slip rings, a plurality of commutators driven from said rotor and connected in series between said slip rings and connected to the direct current winding of said rotor, brushes bearing on said commutators and connected to said windings, and means for establishing a conductive by-pass circuit around each of said windings during commutation with respect to such winding.

3. A dynamo-electric machine comprising a stator constituting a polyphase transformer element and having a plurality of primary and secondary windings associated in transformer relation, a rotor having a direct current winding, a plurality of slip rings driven from said rotor, brushes bearing on said slip rings, a plurality of commutators driven from said rotor and connected in series between said slip rings and connected to the direct current winding of said rotor, brushes bearing on said commutators and connected to said primary windings, and means for establishing a conductive by-pass circuit around each of said primary windings during commutation with respect to such primary winding.

4. A dynamo-electric machine comprising a stator constituting a polyphase transformer element and having a plurality of primary and secondary windings associated in transformer relation, a rotor having a direct current winding, a plurality of slip rings driven from said rotor, brushes bearing on said slip rings, a plurality of commutators driven from said rotor and connected in series between said slip rings and connected to the direct current winding of said rotor, brushes bearing on said commutators and connected to said primary windings, and means for establishing a conductive by-pass circuit around each of said primary windings during commutation with respect to such primary winding and varying the resistance of said by-pass circuit from a predetermined value just prior to commutation, to a minimum value at the instant of commutation, and increasing the resistance of the by-pass circuit just after commutation.

5. A dynamo-electric machine comprising a plurality of windings bearing a polyphase relation to each other, a rotor having a short-circuited winding, a plurality of slip rings driven from said rotor, brushes bearing on said slip rings, a plurality of commutators driven from said rotor and connected in series between said slip rings, brushes bearing on said commutators and connected to said windings, and means for establishing a conductive by-pass circuit around each of said windings during commutation with respect to such winding.

KLAUS L. HANSEN.

REFERENCES CITED

The following references are of record in the file of this patent:

UNITED STATES PATENTS

| Number | Name | Date |
| --- | --- | --- |
| 271,169 | Waterhouse | Jan. 23, 1883 |
| 596,567 | Blondel et al. | Jan. 4, 1898 |
| 1,267,969 | Bullock | May 28, 1918 |
| 1,659,110 | Lennox | Feb. 14, 1928 |